United States Patent [19]

Thomas et al.

[11] Patent Number: 4,906,098

[45] Date of Patent: Mar. 6, 1990

[54] OPTICAL PROFILE MEASURING APPARATUS

[75] Inventors: Alan E. Thomas, Tulsa, Okla.; Leon E. Thompson, Slippery Rock, Pa.

[73] Assignee: Glass Technology Development Corporation, Sapulpa, Okla.

[21] Appl. No.: 192,584

[22] Filed: May 9, 1988

[51] Int. Cl.[4] .................. G01B 11/24; G01B 11/10
[52] U.S. Cl. .................... 356/376; 356/386; 356/394; 356/398; 356/428; 356/240; 250/223 B; 250/560; 209/525
[58] Field of Search ............... 356/376, 384, 385, 386, 356/387, 394, 398, 240, 428; 250/223 B, 560; 209/525

[56] References Cited

U.S. PATENT DOCUMENTS

| | | | |
|---|---|---|---|
| 3,765,774 | 10/1973 | Petrohilos | 356/156 |
| 3,791,741 | 2/1974 | Brenholdt | 356/163 |
| 3,796,492 | 3/1974 | Cullen et al. | 356/4 |
| 3,858,983 | 7/1975 | Foster et al. | 356/163 |
| 3,895,870 | 7/1975 | Cullen et al. | 356/1 |
| 3,905,705 | 9/1975 | Petrohilos | 356/160 |
| 3,918,816 | 11/1975 | Foster et al. | 356/167 |
| 3,961,838 | 6/1976 | Zanoni | 350/7 |
| 4,007,992 | 2/1977 | Petrohilos et al. | 356/160 |
| 4,037,968 | 7/1977 | King et al. | 356/160 |
| 4,043,673 | 8/1977 | Harris et al. | 356/160 |
| 4,064,534 | 12/1977 | Chen et al. | 250/560 |
| 4,074,938 | 2/1978 | Taylor | 356/160 |
| 4,082,463 | 4/1978 | Dehait et al. | 356/167 |
| 4,097,158 | 6/1978 | Dehait | 356/160 |
| 4,170,417 | 10/1979 | Tourres | 356/385 |
| 4,373,817 | 2/1983 | Coates | 356/384 |
| 4,395,119 | 7/1983 | Nakata et al. | 356/73 |
| 4,437,985 | 3/1984 | Hinds et al. | 209/538 |
| 4,465,937 | 8/1984 | Forbes | 356/376 |
| 4,625,107 | 11/1986 | Planke | 250/223 |
| 4,644,151 | 2/1987 | Juvinall | 250/223 B |
| 4,657,395 | 4/1987 | Shiraishi et al. | 356/385 |
| 4,676,648 | 6/1987 | Schulz et al. | 356/385 |

Primary Examiner—F. L. Evans
Attorney, Agent, or Firm—Senniger, Powers, Leavitt and Roedel

[57] ABSTRACT

An apparatus for measuring the profile of portions of an article located within a predefined plane. Each portion is scanned, such as by an optical micrometer providing a beam of radiant energy, to determine its dimension. The distance between each portion and a vertical reference is also scanned to determine its dimension. The article is rotated about an axis intersecting the predefined plane within the scan of the beam and is axially moved along an axis parallel to the intersecting axis within the scan of the beam so that the dimension of each portion and its distance from the vertical reference can be determined. The apparatus may be used in combination with a cavity identification system to control manufacturing employing multiple molds.

51 Claims, 6 Drawing Sheets

| | | 0 | 100 | 6,000 | 12,400 | 12,500 | 16,900 | 17,000 | 17,200 | 17,400 | 19,300 | 19,400 | 19,500 | 19,600 | 19,760 | |
|---|---|---|---|---|---|---|---|---|---|---|---|---|---|---|---|---|
| GR | 1 | 1.1374 | 1.1382 | 1.1382 | 2.3162 | 2.3165 | 2.3005 | 2.3164 | 2.1154 | 2.0160 | 2.4158 | 5.5071 | 5.5071 | 2.5130 | 2.5171 | |
| GAP | 2 | 1.1391 | 1.1390 | 1.1388 | 2.3165 | 2.3161 | 2.3000 | 2.3161 | 2.1149 | 2.0155 | 2.4168 | . | . | . | . | |
| | 3 | 1.1397 | 1.1396 | 1.1388 | 2.3160 | 2.3162 | 2.3009 | 2.3169 | 2.1159 | 2.0165 | 2.4167 | . | . | . | . | |
| (CM) | 4 | 1.1400 | 1.1399 | 1.1398 | 2.3166 | 2.3161 | 2.3001 | 2.3173 | 2.1155 | 2.0166 | 2.4166 | . | . | . | . | |
| | 400 | 1.1371 | 1.1380 | 1.1381 | 2.3169 | 2.3164 | 2.3004 | 2.3169 | 2.1155 | . | . | . | . | . | . | |
| DR | 1 | 3.5161 | 3.5149 | 3.5155 | 1.1480 | 1.1489 | 1.2037 | 1.1483 | 1.3487 | 1.3481 | 0.9478 | 0 | 0 | 0.5003 | 0.4998 | |
| DIAMETER | 2 | 3.5167 | 3.5150 | 3.5152 | 1.1485 | 1.1499 | 1.2031 | 1.1481 | 1.3489 | 1.3485 | 0.9482 | 0 | 0 | 0.5001 | 0.4997 | |
| | 3 | 3.5169 | 3.5151 | 3.5157 | 1.1483 | 1.1479 | 1.2032 | 1.1485 | 1.3491 | 1.3489 | 0.9485 | 0 | 0 | 0.5004 | 0.4999 | |
| | 4 | 3.5168 | 3.5151 | 3.5155 | 1.1482 | 1.1482 | 1.2033 | 1.1489 | 1.3493 | 1.3495 | 0.9490 | 0 | 0 | 0.4999 | 0.5000 | |
| | 400 | 3.5161 | 3.5150 | 3.5152 | 1.1479 | 1.1488 | 1.2036 | 1.1486 | 1.3489 | . | . | 0 | 0 | 0.5002 | 0.5001 | |

Groupings: B, E, A, E, T½+E½, E½+T½, F diff = h (between 2.3169 and 2.1155)

ROTATIONAL COUNTER 360° = 400 PULSES
VERTICAL COUNTER 0.05" = 100 PULSES
ROD 326
H, H', C, D

OPTICAL PROFILE MEASURING APPARATUS

FIELD OF THE INVENTION

The invention generally relates to optical micrometers for determining the size of an object and, in particular, an optical scanning device for measuring the profile of an object such as a bottle. The invention also relates to the use of such a device in combination with a cavity identification system of a bottle manufacturing plant employing multiple molds.

BACKGROUND OF THE INVENTION

Optical micrometers are well known in the prior art such as disclosed in coassigned U.S. Pat. No. 4,082,463, incorporated herein by reference, for a Calibrated Optical Micrometer. Therein, an optical micrometer utilizes a precisely dimensioned grate which is temporarily introduced into the optical path of the instrument within its zone of measurement. A beam of light is scanned through the zone of measurement and across the grate, and the information obtained therefrom is recorded in an electronic memory. Thereafter, articles subsequently placed within the zone of measurement are scanned by the beam and the information obtained therefrom is compared against the calibration data to provide an accurate measurement of the article.

Coassigned U.S. Pat. No. 4,074,938, also incorporated herein by reference, describes an optical dimension measuring device employing an elongated, focused beam. Coassigned U.S. Pat. No. 4,097,158, also incorporated herein by reference, describes a half-maximum threshold circuit for an optical micrometer. However, these micrometers can only determine the diameter of an article to be scanned and cannot determine the profile of the article. "Profile" means a dimensional representation of an object viewed from the side, i.e., the external dimensions of the object and the relationship between the dimensions.

In general, profiles have been measured manually by employing "go/no-go" gauges which determine whether certain profile dimensions are within desired limits. Such manual measurements are time consuming and not highly accurate.

SUMMARY OF THE INVENTION

Accordingly, it is an object of this invention to provide an optical profile measuring apparatus which employs an optical micrometer to determine the profile of an object to be measured.

It is another object of this invention to provide an optical profile measuring apparatus which determines the profile of an object by scanning the object with a beam of radiant energy and without physically contacting the object.

It is still another object of this invention to provide an optical profile measuring apparatus for determining the profile of objects such as bottles, automobile parts and plastic articles.

It is yet another object of this invention to provide an optical profile measuring apparatus which can determine the profile of an article more accurately and more quickly than manual inspection and measurement.

It is a further object of this invention to provide an optical profile measuring apparatus for use in a bottle manufacturing plant to measure the profile of bottles consistently and continuously as the bottles are manufactured.

It is a still further object of this invention to provide an optical profile measuring apparatus for use in combination with a cavity identification system and molding apparatus of a bottle manufacturing plant employing multiple molds wherein the optical profile measuring apparatus identifies the cavities which are producing bottles having unacceptable profiles.

It is another object of this invention to provide an optical profile measuring apparatus which can randomly determine some of the profile measurements of a bottle to monitor the molding operation of a bottle manufacturing plant.

One form of the invention comprises an apparatus for measuring the profile of portions of an article. Means aligns the portions of the article to be profiled with a predefined plane. Means measures the width of each portion of the article aligned with the predefined plane and measures the distance of each portion of the article from a first reference.

Another form of the invention comprises a method for measuring the profile of portions of an article comprising the following steps. The portions of the article to be profiled are aligned with a predefined plane. The width of each portion of the article aligned with the predefined plane is measured. The distance of each portion of the article from a first reference is measured.

Another form of the invention comprises an apparatus for inspecting an article manufactured by a multiple cavity mold. Means identifies the cavity from which the article was molded. Means aligns the portions with a predefined plane and measures the width of the portion and its distance from a first reference. Means compares the measured profile to a reference.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
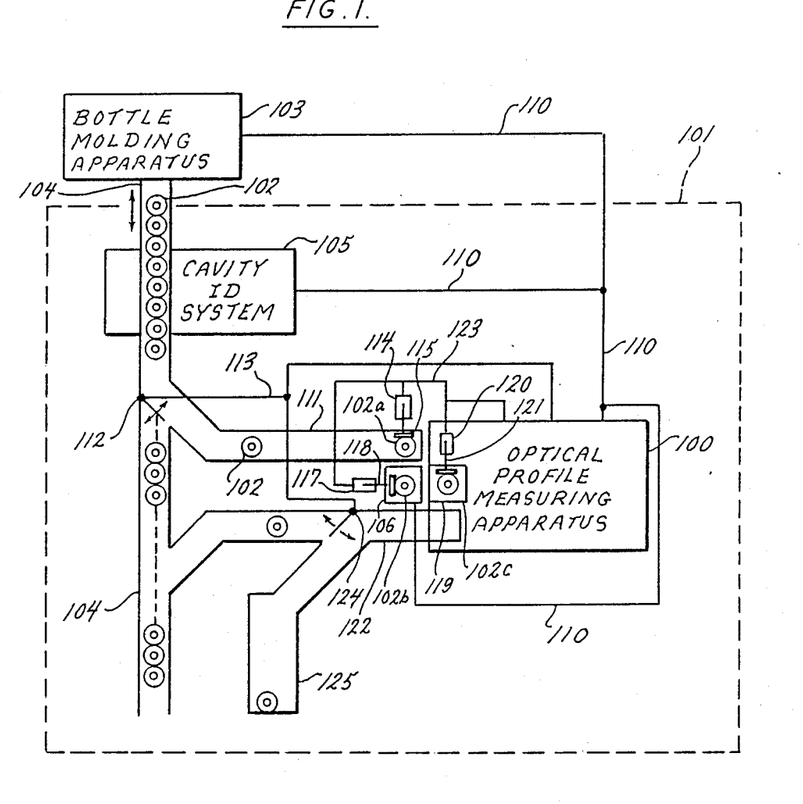
FIG. 1 is a diagrammatic top plan view of the optical profile measuring apparatus according to the invention in combination with a bottle conveyor carrying bottles from a bottle molding apparatus and through a cavity identification system.

Referring to FIG. 1, the optical profile measuring apparatus according to the invention is generally referred to by reference character 100. It is contemplated that apparatus 100 may be used to measure the profile of any article such as a bottle, automotive part, plastic part, or other article of manufacture. In one preferred embodiment of the invention, it is contemplated that apparatus 100 be used as part of an apparatus for inspecting an article manufactured with multiple cavities or molds, such as a bottle inspection system generally referred to by reference character 101 for inspecting bottles 102 manufactured by bottle molding apparatus 103. Profile, as used herein, refers to a dimensional representation of the article as viewed from a side, i.e., the external dimensions of an article and the spatial relationship between the dimensions of the portions of the article. For example, a profile of a bottle having a neck tapering into a cylindrical body would include the various diameters of the neck and body and the height of the neck, taper and body. These measurements are taken from various side perspectives of the bottle in relation to a (vertical) first reference to determine its ovality as well. The lean of the bottle is the inclination of the bottle away from the vertical when the bottle is supported in a substantially vertical position on a substantially horizontal surface. The lean of the bottle defines the spatial relationship between the neck, taper and body as compared to a vertical reference and is part of the profile. The tilt of the bottle defines the spatial relationship between the top and bottom surfaces of the bottle, i.e., between the sealing surface and the heel, and can be determined by measuring the height of the bottle as viewed from various side perspectives. In addition, an internal profile of an object having an opening therethrough can also be determined by apparatus 100.

Bottle molding apparatus 103 generally consists of a machine having a plurality of molds or cavities used to form bottles from molten glass or plastic. Each mold of the machine can have unique markings so that products of a particular cavity can be readily identified. Many systems known in the prior art provide cavity identification. For example, each cavity may provide markings on the bottom or side of the bottle which can be detected to determine the mold from which the bottle was made. Variously spaced concentric rings, dots or other markings may be molded into the base or heel of the bottles with each cavity providing markings which have a unique spacing or design.

After bottles are molded by bottle molding apparatus 103, bottles 102 are positioned on high speed production conveyer 104 for delivery to means for identifying the cavity from which the bottle (article being manufactured) was molded, such as cavity identification system 105. Conveyer 104 may be any standard bottle moving apparatus known in the prior art such as a horizontal belt conveyer or a channel through which the bottles are pushed.

Cavity identification system 105 is any system which can detect the various markings on the base or heel of the bottle to determine and identify the cavity from which the bottle was made. The cavity within which a particular bottle has been made must be known so that, during later inspection operations, the cavity of an unacceptable bottle can be readily identified. Generally, bottles are provided by bottle molding apparatus 103 at a rate of approximately 300 bottles per minute so that the speed of conveyer 104 is synchronized to carry this number of bottles and cavity identification system 105 is also synchronized to this speed.

After the bottle's cavity of origin is identified, conveyer 104 carries the bottles past the conveyer branch 111 which supplies bottles to weight station 106 and to means for measuring a profile of portions of the identified bottle (article) which may include means for comparing the measured profile to a profile of a reference bottle, such as optical profile measuring apparatus 100. Apparatus 100 controls diverting gate 112 via line 113 to selectively provide bottles for profiling to branch 111. Apparatus 100 is provided with information regarding the cavity from which each bottle is made via line 110. This information permits apparatus 100 to randomly or pseudo-randomly select the bottles to be profiled or to systematically and periodically select the bottles from each of the cavities to be profiled. Apparatus 100 is also provided with the weight of each bottle by weight station 106 via line 110 so that bottles for profiling may be selected based on weight.

Conveyer branch 111 carries the bottles 102 to a first transfer station including pneumatic cylinder 114 which actuates push rod 115 to move the first bottle 102a from conveyer branch 111 to weight station 106. Containers are identified at the cavity identification system 105 and samples from each mold are selected for measurement. The selected sample is transported in such a way that measurement data can be correlated with the cavity number. In particular, each bottle is weighed at weight station 106 to verify its weight indicating that the right amount of product (e.g., glass, plastic, ceramic, metal) has been used to form the bottle. If the weight of the bottle is not within acceptable tolerances, weight station 106 activates gate 124 at the appropriate time via measuring apparatus 100 and line 113 to move the unacceptable bottle into reject deposit area 125. Weight station 106 communicates with the cavity identification system 105 and measuring apparatus 100 via line 110 so that weight station 106 knows the cavity identity of each bottle it weights and can advise measuring apparatus 100 of bottles which have out of tolerance weight and need not be profiled. Furthermore, if it is determined that a pattern failure exists and this failure is due to bottles being made in a particular cavity, weight station 106 and/or measuring apparatus 100 can notify bottle molding apparatus 103 (or the operator) via line 110 for the cavity which is providing unacceptable bottles so that the problem can be corrected or so that the system can be shut down to diagnose the problem more fully. After weighing, the sample proceeds to optical profile measuring apparatus 100 for determination of the profile of selected portions. Alternatively, profiling may not be performed if the weighing determines that the sample is out of tolerance.

Bottle 102b is located at a second transfer station including pneumatic cylinder 117 which actuates push rod 118 to move the bottle from weight station 106 to the profiling platform 119. After the optical profile measuring apparatus has completed its profile of bottle 102c located on profiling platform 119, pneumatic cylinder 120 actuates push rod 121 to move bottle 102c onto return conveyer branch 122. Optical profile measuring apparatus 100 controls the operation of cylinders 114, 117 and 120 via line 123. Apparatus 100 and weight station 106 control gate 124 via line 113 and activate the gate when a bottle of unacceptable profile has been measured so that the unacceptable bottle is forced into reject deposit area 125. If bottle 102d has a profile which is acceptable, the bottle is returned to conveyer 104 by return conveyer branch 122.

Optical profile measuring apparatus 100 is in communication with bottle molding apparatus 103, cavity identification system 105 and weight station 106 via line 110. In the event that a bottle of unacceptable profile is measured, apparatus 100 via communication with cavity identification system 105, determines the cavity of the bottle and can operate gate 112 via line 113 to profile additional bottles from the suspect cavity. In the event that a pattern failure is discovered, apparatus 100 can notify bottle molding apparatus 103 of the failure or alternatively notify an operator so that the failure can be corrected, so that use of the particular cavity producing the failed bottles can be discontinued, or so that the system can be shut down for repairs.

Figure 2:
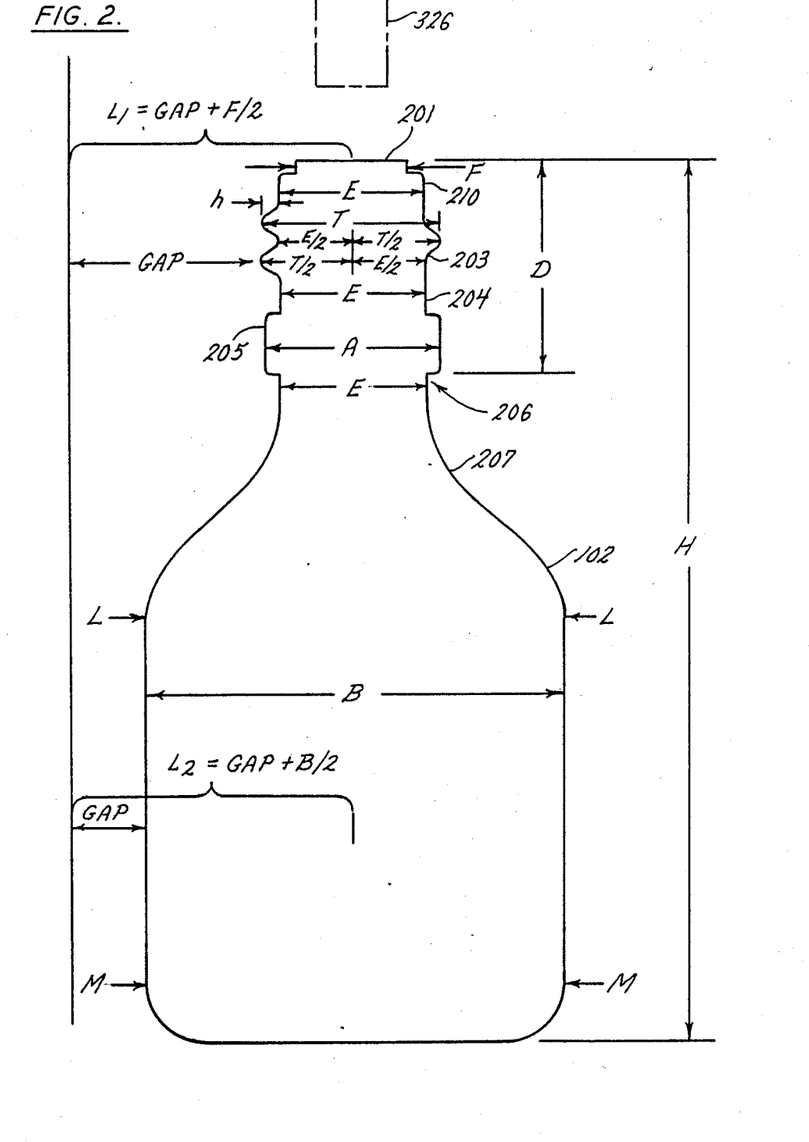
FIG. 2 is a front plan view of a bottle illustrating profile dimensions which can be determined by an optical profile measuring apparatus according to the invention.
Figure 2A:
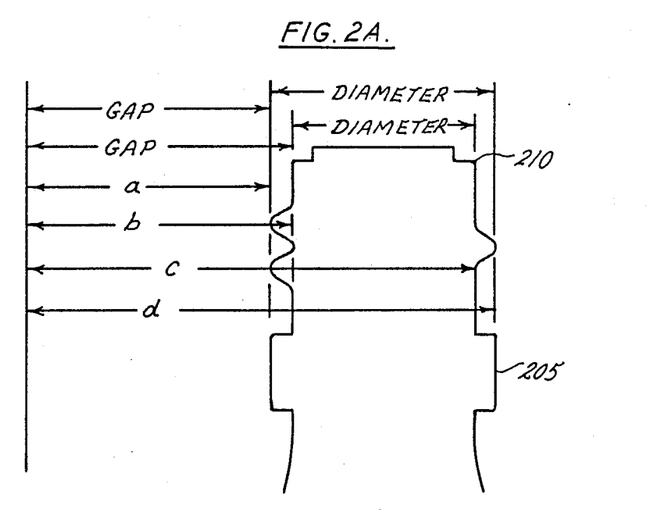
FIG. 2A is an exploded, front plan view of a bottle finish illustrating profile dimensions which can be determined by an optical profile measuring apparatus according to the invention.

Referring to FIG. 2, the profile of bottle 102 is illustrated including some of the dimensions that optical profile measuring apparatus 100 may be used to determine. Dimension F is the outside diameter at the top of the sealing surface 201 at the mouth of the bottle. Dimension T is the outside diameter of the thread 202 around finish 204 of the bottle. The neck or upper portion of the bottle which engages the closure or cap is generally referred to herein as the finish. FIGS. 2 and 2A illustrate twist-off finishes. However, it is contemplated that the invention may also be used with crown or other finishes. Dimension E is the diameter of the thread root of the finish. Alternatively, the lean may be calculated as follows. Referring to FIG. 2A showing the bottle finish, dimension T may be calculated, at any given rotational angle, by subtracting dimension (a) from dimension (d), i.e., $T=(d)-(a)$, where (d) is the largest gap plus diameter dimension between upper finish 210 and locking ring 205 and where (a) is the smallest gap dimension between upper finish 210 and locking ring 205. Similarly, dimension E may be calculated, at any given rotational angle, by subtracting dimension (c) from dimension (b), i.e., $E=(c)-(b)$, where (c) is the smallest gap plus diameter dimension between upper finish 210 and locking ring 205 and where (b) is the largest gap dimension between upper finish 210 and locking ring 205.

Referring to FIG. 2, dimension A is the outside diameter of the locking ring 205 which is generally engaged by the locking ring of the cap. Dimension D is the height of the finish from the top surface 201 to the bottom of the locking ring 205. Dimension H is the height of the bottle measured from the surface on which the bottle is supported (e.g., platform 318 in FIG. 3) to the top of the sealing surface 201 at the mouth of the bottle. Dimension B is the outside diameter of the body of the bottle 102 from the shoulder of the bottle to the heel of the bottle. Dimension h is the height of the thread as it projects from the finish of the bottle.

Figure 3:
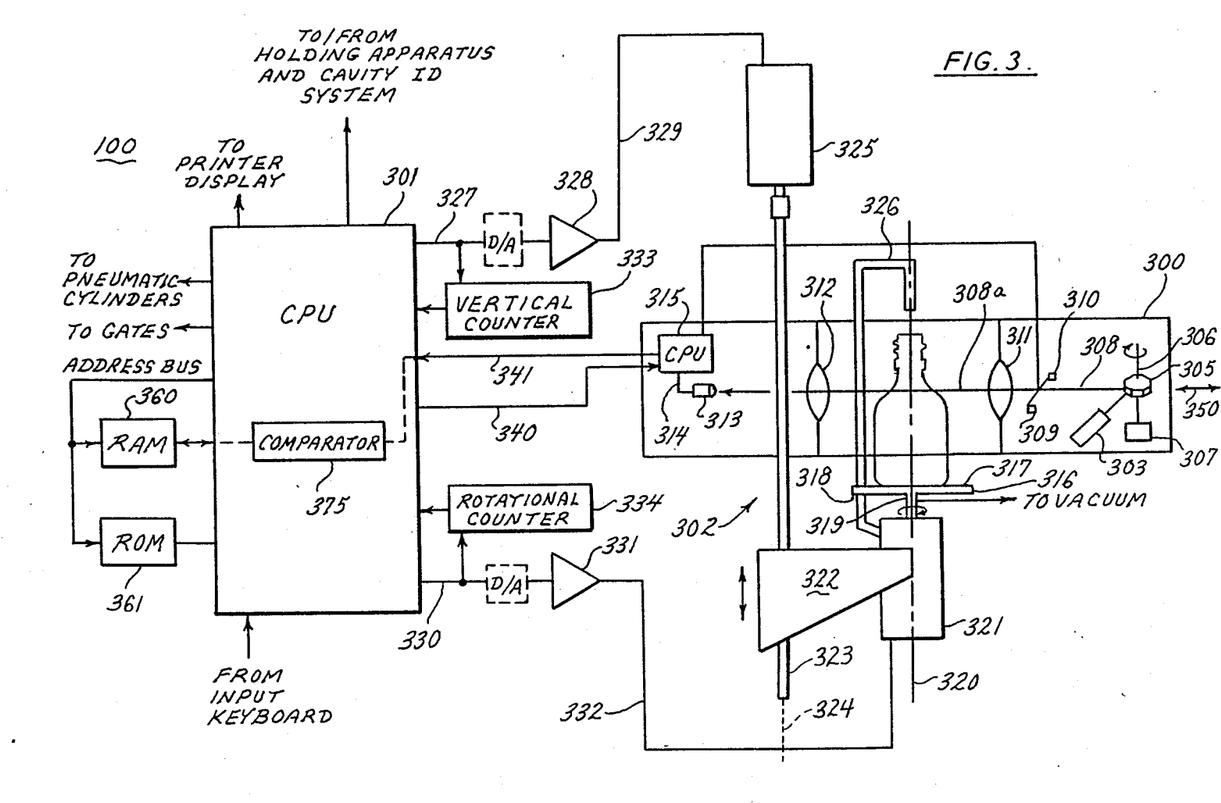
FIG. 3 is a diagrammatic side view partially in block diagram form and partially in plan view of one embodiment of the optical profile measuring apparatus according to the invention.

Referring to FIG. 3, one preferred embodiment of an optical profile measuring apparatus according to the invention is illustrated. Apparatus 100 includes optical micrometer 300, central processing unit (CPU) 301 and means for aligning the portions of the article to be profiled with a predefined plane such as means for moving the bottle 102 through a predefined plane indicated as plane 350 so that each portion of the bottle to be profiled passes through the predefined plane, such means generally referred to by reference character 302. Alternatively, the measuring plane 350 may scan the bottle 102 so that the measuring plane 350 optically moves over the bottle 102.

The specific structure and operation of one embodiment of the optical micrometer 300 is described in U.S. Pat. Nos. 4,074,938, 4,082,463, and 4,097,158, incorporated herein by reference. In general, optical micrometer 300 includes a laser 303 providing a beam 304 of collimated light. Beam 304 is directed at rotating mirror 305. Mirror 305 may be a single surface mirror as illustrated in the above-referenced patents or may be a multisurfaced mirror. As illustrated in FIG. 3, mirror 305 is shown as a six-sided mirror.

Mirror 305 is supported by shaft 306 rotated by motor 307. As the mirror is rotated, beam 304 is reflected to create a scanning beam 308 which moves in generally horizontal scanning plane 350. Specifically, scanning beam 308 moves from first photodetector 309 to second photodetector 310 between which is defined the scanning sector frequently referred to as a zone of measurement. Scanning beam 308 passes through first scan lens 311 which corrects for any divergence in the beam as a result of the reflection of beam 304 by mirror 305. The focal point of first scan lens 311 is located at the point at which the beam 304 strikes rotating mirror 305 so that scanning beam 308a comprises a continuously scanning beam located within scanning plane 350. Scanning beam 308a at any point within the zone of measurement is substantially parallel to the scanning beam at any other point with the zone of measurement.

Scanning beam 308a scans across bottle 102 and is interrupted by the portion of the bottle located within scanning plane 350. The uninterrupted portion of scanning beam 308a passes through second scan lens 312 which focuses the parallel scanning beam onto photodetector 313. The output of photodetector 313 is provided via line 314 to the central processing unit (CPU) 315 of optical micrometer 300. Photodetector 313 is located at the focal point of second scan lens 312 so that parallel light beams 308a passing through lens 312 will be focused onto the surface of photodetector 313.

In order to permit the scanning beam 308a to scan the entire profile of bottle 102, bottle 102 must be rotated and moved upward and/or downward so that the entire bottle or those portions (horizontal slices) of the bottle to be scanned pass through scanning plane 350. Moving means 302 is provided to move the bottle and includes, specifically, a base or platform 316 substantially parallel to plane 350 and having an upper surface 317 on which the bottle 102 is located and having a lower surface 318 connected to shaft 319 parallel to intersecting axis 320. To permit a complete scan of the bottle 102, it is moved along intersecting axis 320 so that scanning beam 308a scans from the top of the bottle to the heel of the bottle which is positioned on platform 316 or the measurement plane is optically moved to achieve the same result.

Preferably, intersecting axis 320 is coaxial with shaft 319 and perpendicular to scanning plane 350. Shaft 319 is supported by and engages servo system or (first) rotational stepping motor 321 which is adapted to rotate shaft 319. Platform 316, shaft 319 and motor 321 comprise means for rotating the bottle (article) about an axis intersecting predefined scanning plane 350 within the scan of beam 308a.

Motor 321 is supported in a substantially vertical orientation by traveling nut 322 which engages the threads of and is supported by lead screw 323. Lead screw 323 has a longitudinal axis 324 parallel to intersecting axis 320. Another servo system or (second) vertical stepping motor 325 is provided to axially move the platform 316 along an axis parallel to the intersecting axis 320. In particular, motor 325 engages lead screw 323 to rotate the lead screw about its longitudinal axis 324 to cause the traveling nut 322, the first stepping motor 321 and the platform 316 to move along the intersecting axis 320. Lead screw 323 and motor 325 comprise means for axially moving the bottle (article) along an axis parallel to intersecting axis 320 within the scan of beam 308a. Optionally, a second (horizontal) reference such as rod 326 is supported by the rotational stepping motor 321 and is located around and above the bottle 102 to provide a horizontal reference for the optical micrometer. Rod 326 is U-shaped having one leg supported by traveling nut 322 substantially parallel to intersecting axis 320 and the other leg located over platform 316 such that bottle 102 is located between and coaxial with the second leg and platform 316. This reference rod 326 permits the optical micrometer to determine height of the object (i.e., bottle) being profiled because its end provides a reference spaced a known distance from scanning plane 350, i.e., depending on the vertical position of platform 316, the distance between scanning plane 350 and the end of rod 326 is known or can be determined as noted below. Alternatively, height can be determined with reference to the top surface 317 of platform 316.

Operation of stepping motors 321 and 325 is controlled by central processing unit 301. In order to move bottle 102 up and down through scanning plane 350, CPU 301 provides control signals or pulses via line 327 to vertical stepping motor driver 328 which in turn provides drive signals or pulses via line 329 to vertical stepping motor 325. For maximum vertical resolution, vertical stepping motor 325 is instructed to move a minimum amount. To rotate platform 316 and thereby rotate bottle 102 within the scanning plane, CPU 301 provides control signals or pulses via line 330 to rotational stepping motor driver 331 which in turn provides drive signals or pulses via line 332 to rotational stepping motor 321.

Vertical counter 333 counts the control signals provided to vertical stepping motor driver 328 by CPU 301 via line 327 and provides the count information to CPU 301. Similarly, rotational counter 334 counts the control signal rotation information. Counters 333 and 334 may be an integral part of the CPU 301 such as an internal random access memory.

Figure 4:
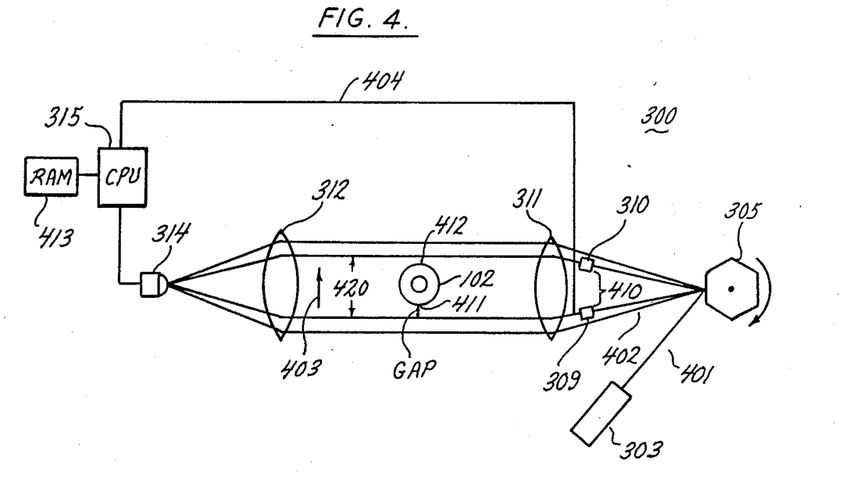
FIG. 4 is a diagrammatic top plan view of one embodiment of an optical micrometer for use with the optical profile measuring apparatus according to the invention.
Figure 5:
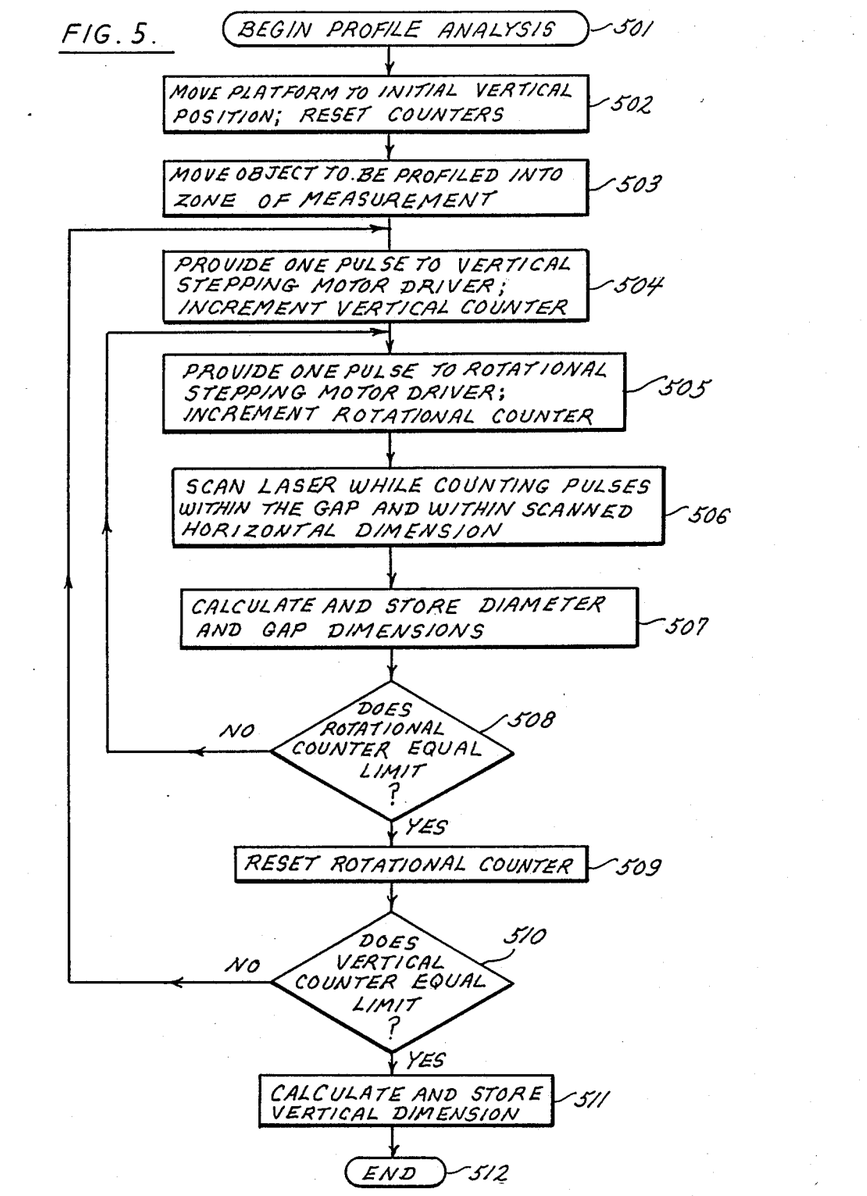
FIG. 5 is a flow chart of the steps of one preferred method of operation of the optical profile measuring apparatus according to the invention.

Referring to FIGS. 3, 4, and 5, operation of the optical profile measuring apparatus 100 including optical micrometer 300 will be described. The profile analysis begins (step 501) either automatically by initiating the manufacture cycle of bottles by the system as illustrated in FIG. 1 or manually by an input command from an operator. For example, an operator may provide a start command by a keyboard to CPU 301. Read only memory (ROM) 361 is programmed with instructions for performing the profile analysis as illustrated in FIG. 5. In response, CPU 301 provides a signal or series of control pulses via line 327 to vertical stepping motor driver 328 in order to activate vertical stepping motor 325 to move platform 318 to the initial vertical position. (If drivers 328 and 331 are responsive to analog control signals and CPU 301 provides digital control signals via lines 327 and 330, respectively, digital-to-analog (D/A) converters may be used between CPU 301 and drivers 328 and 331.) Driver 328 provides the appropriate number of drive pulses, as commanded by CPU 301, to vertical stepping motor 325 to move traveling nut 322 and platform 318 to its uppermost or lowermost position so that the profile analysis can begin. CPU 301 then resets vertical counter 333 and rotational counter 334. This completes step 502. CPU 301 then activates pneumatic cylinders 120, 117, and 114 in sequential order and repeats this cycle until an object to be profiled is located within the zone of measurement, i.e., on platform 318 (step 503). Optionally, CPU 301 could then provide one or more control pulses to vertical stepping motor driver 328 thereby incrementing vertical counter 333 (step 504) and rotating motor 325. For the initial scan, step 504 is unnecessary. Optionally, CPU 301 may also provide one or more control pulses to rotational stepping motor driver 331 thereby incrementing rotational counter 334 (step 505) and rotating motor 321. Step 505 is also unnecessary upon initiation of the profile analysis.

CPU 301 then activates optical micrometer 300 via serial interface 340 therebetween so that CPU 315 begins the scanning cycle of optical micrometer 300. CPU 315 activates motor 307 to rotate mirror 305 and activates laser 303 to provide the scanning beam (step 506). As shown in FIG. 4 by way of example, beam 40 initially strikes clockwise rotating mirror 305 and is reflected as beam 402 striking photodetector 314. As mirror 305 continues its clockwise rotation, beam 402 moves in the direction of arrow 403 and strikes first reference photodetector 309 signaling CPU 315 via line 404 that beam 402 has begun scanning within the zone of measurement 410. Upon receiving a signal from photodetector 309 CPU 315 begins counting clock pulses provided by an internal clock. The counting operation is specifically described in U.S. Pat. Nos. 4,082,463, 4,074,398 and 4,097,158, incorporated herein by reference. The analog signals provided to CPU 315 by the photodetectors 309, 310 and 313 may be converted to digital signals by an analog-to-digital converter or by threshold detectors (not shown).

As beam 402 continues to scan in the direction of arrow 403, it is eventually interrupted when it encounters first edge 411 of bottle 102 and beam 402 does not reach photodetector 314. This interruption is detected by CPU 315 and the number of clock pulses which have been counted during the time that beam 402 has scanned the gap between first photodetector 309 and first edge 411 of bottle 102 is stored in memory such as an internal memory or random access memory 413. CPU 315 continues to count clock pulses and to scan until beam 402 finally moves past second edge 412 of bottle 102 and is no longer interrupted so that the beam is again detected by photodetector 314. CPU 315 then detects that beam 402 is no longer interrupted because photodetector 314 is again providing it with an output signal. CPU 315 then stores the number of clock pulses which occurred during the interrupted scan between first edge 411 and second edge 412 which corresponds to the diameter of the portion of bottle within the scanning plane. Beam 402 continues to move in the direction of arrow 403 until it is interrupted by second reference photodetector 310 indicating that it has completed the scanning of zone of measurement 410. CPU 315 then stores in memory 413 the total number of clock pulses during the scan within zone of measurement 410 from first reference photodetector 308 to second reference photodetector 310. CPU 315 may also store in memory 413 the number of clock pulses between second edge 412 and photodetector 310 or this count can be calculated by subtracting the number of clock pulses in the gap and between edges 411 and 412 from the total number of clock pulses.

In the event that the article being scanned is transparent or translucent such as a clear bottle, the scan of beam 402 may not be interrupted by the clear bottle because the beam will pass therethrough. In fact, if the clear bottle creates a lensing effect, light passing through the article and striking photodetector 313 may exhibit an increase in intensity because the clear bottle would focus the beam onto the photodetector. In any case, CPU 301 can be programmed to detect transitions in the signal provided to it by photodetector 314. A transition will occur in the intensity of beam 402 as it begins to scan the first edge and second edge of the clear bottle which will result in a transition in the signal photodetector 314 supplies to CPU 315 so that the diameter of the scanned portion of the clear bottle can be determined.

Optical micrometer 300 can be calibrated such as in accordance with U.S. Pat. No. 4,082,463. CPU 315 has stored the number of clock pulses within the gap, the number of clock pulses during the interruption caused by bottle 102 (i.e., between edges 411 and 412) and the total number of clock pulses within the zone of measurement between photodetectors 309 and 310. Therefore, CPU 315 can calculate the gap dimension and the diameter of bottle 102 within the scanning plane because the distance between photodetectors 309 and 310 is known and fixed so that dimensions and clock pulses can be directly correlated. For example, assume a linear scanning velocity and that zone of measurement 410 equals a distance of 10 centimeters as referred to by reference character 420 in FIG. 4, and that 1000 clock pulses correspond to the scan time between photodetectors 309 and 310. If 100 pulses correspond to the scan time within the gap (i.e., from photodetector 309 to edge 411), then the gap equals 1.0 centimeters. If 650 pulses correspond to the scan time between edges 411 and 412, then the diameter of the portion of bottle 102 within scanning plane 350 equals 6.5 centimeters. This information can be stored in memory 413 and/or provided to CPU 301 via line 341. As a result, optical micrometer 300 has performed the step of scanning the laser while counting clock pulses within the gap and within the scanned horizontal dimension of the object being scanned (step 506). Furthermore, CPU 315 has performed the step of calculating and storing the diameter (scanned horizontal) and gap dimensions (step 507).

Once these steps are completed, CPU 315 indicates via line 341 the completion of the steps to CPU 301. CPU 301 then interrogates rotational counter 334 to determine whether the rotational count equals the limit (step 508). For example, if 400 counts equal 360 mechanical degrees, then a count of 200 within rotational counter 334 would indicate that the object has been rotated within 180° and can be moved to the next scanning position.

If the count within rotational counter does not equal the limit, CPU 301 returns to step 505 and provides a control pulse to rotational stepping motor driver 328 to increment rotational counter 333. CPU 315 then executes another scan while counting clock pulses within the gap, within the scanned horizontal dimension of bottle 102 (i.e., between edges 411 and 412), and within the zone of measurement 410. CPU 315 then calculates and stores the scanned horizontal and gap dimensions (step 506). Each iteration of rotation following by scanning measures the gap and diameter of the bottle from a different side perspective. This process continues until the rotational counter equals the limit at which point it is reset by CPU 301 (step 509) and vertical counter 333 is interrogated (step 510). If the count in vertical counter 333 equals the number of pulses between the lowermost and uppermost points of movement of platform 318, then CPU 301 calculates and stores the vertical dimension (step 511) and the profile analysis is ended (step 512). If the vertical count does not equal the limit, CPU 301 returns to step 504 and provides one control pulse to vertical stepping motor driver 328 thereby incrementing vertical counter 333 and the rotational scan loop (steps 505, 506, 507) is then executed again.

Alternatively, CPU 301 can be programmed to selectively scan only portions of an article. For example, bottle 102 need not be continuously scanned between points L and M if a scan of one or more points between L and M reveals that dimension B is with desired tolerances. Also, scanning between points L and M can be performed simultaneously with the continuous activation of the stepping motors to obtain a rough estimate of the dimensions in which case the optical micrometer 300 is continuously operating and CPU 315 loads information only at selected points in time as the scanning progresses.

CPU 301 then interrogates its memory such as its internal memory or random access memory 360 in which is stored all the dimensional information to determine the minimum, maximum and difference between the horizontal dimensions F, E, A, and B as shown in FIG. 2. Preferably, CPU 301 has been programmed with information of the specific shape of the object being profiled so that these dimensions can be compared by integral comparator 375 to preset limits to determine whether the bottle dimensions are within tolerance. If the profile of the object is generally unknown, CPU 301 can provide a printout or display of the minimum and maximum dimensions of the object at each horizontal scan.

In addition, apparatus 100 can search for various points along an object such as a minimum or maximum dimension and then determine the dimension of the point or of another point with respect to it. For example, apparatus 100 may scan an object to determine its maximum dimension and them determine the distance between the top of the object and the maximum dimension.

Regarding the calculation of vertical dimensions, the end of rod 326 provides a horizontal reference from which the vertical height of the object can be determined. In particular, the vertical distance between platform 318 and the end of rod 326 is calibrated to a known dimension. This information is input into CPU 301 so that CPU 301 can then correlate the number of vertical scans between platform 316 and the end of rod 326 to this known distance. As a result, the height H and dimension D of the bottle can be calculated.

The lean L of the bottle can be calculated from the scanned information by selecting a rotational position of platform 318 and comparing the dimension of the gap ($L_1$) plus one-half of dimension F to the dimension of the gap plus one-half of dimension B ($L_2$) so that lean $L = L_1 - L_2$. If the bottle has zero lean, these dimensions would all be equal.

The end of rod 326 can also be used for a calibration verification. The diameter of the rod is known so that CPU 301 can periodically lower platform 318 so rod 326 is within zone of measurement 410. Micrometer 300 then measures the diameter of rod 326 and provides the measurement information to CPU 301, which compares it to the known diameter. In the event that the difference between the measured and known diameter of rod 326 exceeds a preset limit, CPU 301 provides a flag to the operator or can execute a recalibration routine.

One preferred method for determining dimension D is as follows. CPU 301 would move platform 316 to its lowermost position so that rod 326 would be in the zone of measurement. Then, CPU 301 would activate vertical stepping motor 325 to quickly move platform 316 upward as micrometer 300 scans. This quick movement would continue until a significant change in the diameter dimension within the zone of measurement appears indicating the beam has encountered the top edge 201 of bottle 102. Having located the top of the bottle, CPU 301 stores the vertical count and can now move platform 316 and bottle 102 upward until locking ring 205 is located within the scanning plane. CPU 301 could locate ring 205 by scanning or CPU 301 could have been previously programmed with the approximate or desired dimensions of bottle 102. Bottle 102 is then moved upward and scanned until a significant change in the diameter dimension appears indicating that beam 402 has encountered transition 206 between locking ring 205 and lower finish 207. The heights of the beginning and ending of transistion 206 are then determined by scanning and averaged to determine the height of the lower point of dimension D. Since the upper point of dimension D, i.e, the top of bottle 102, has already been located and measured with reference to rod 326, dimension D can now be determined by CPU 301. Dimension D can be determined from one or more of the sides of bottle 102 which face the scanning beam. To determine dimension D from another side perspective, rotational stepping motor 321 can be rotated and the above method repeated. Alternatively, bottle 102 may be rotated as it is moved upward to determine an average value of dimension D.

Figure 6:
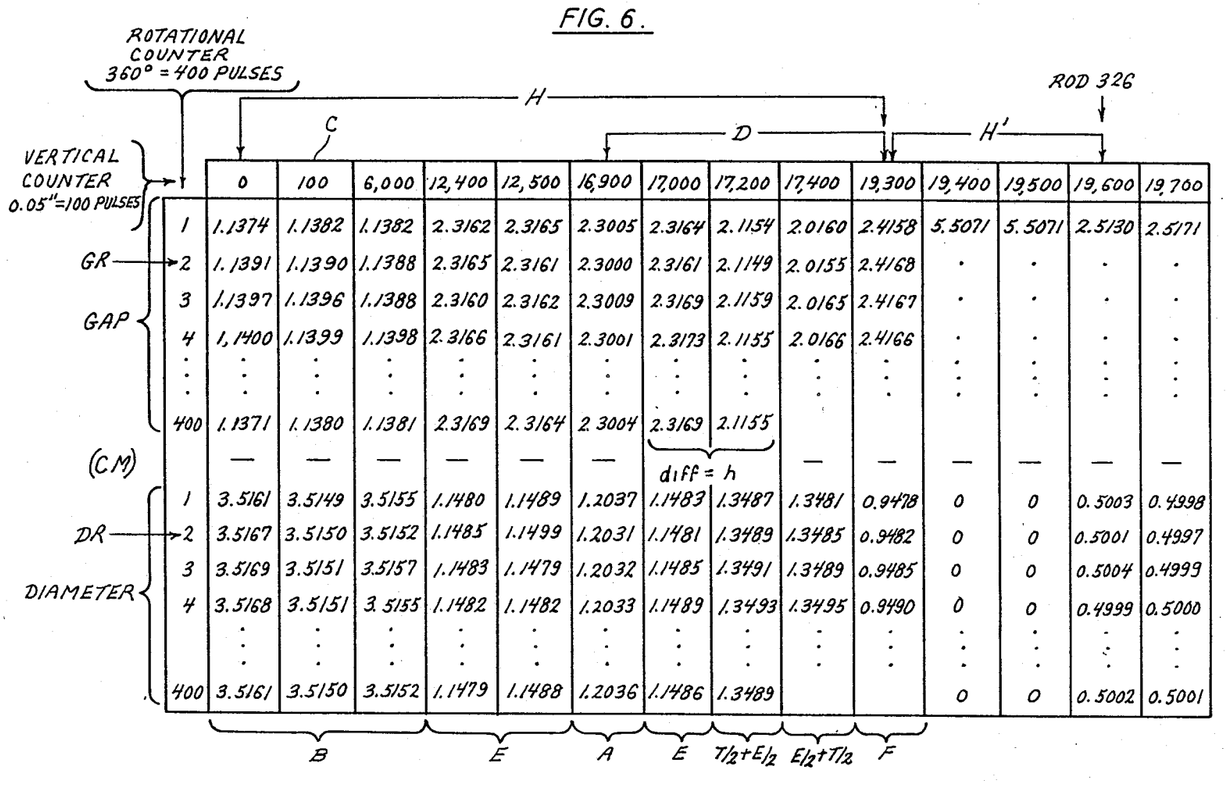
FIG. 6 is a table of some of the dimension data resulting from profiling of the bottle of FIG. 2 by an optical profile measuring apparatus according to the invention.

Referring to FIG. 6, a table is illustrated showing some of the various dimensions that would typically be obtained by employing an optical profile measuring apparatus 100. This data would correspond to the profiling of the bottle illustrated in FIG. 2. Each column represents a vertical position of platform 318 wherein 0.05 cm equals 100 vertical control pulses or counts applied to vertical stepping motor driver 328. Each row represents a rotational position of platform 316 wherein a full rotation of 360° of the platform corresponds to 400 control pulses or counts applied to rotational stepping motor driver 331. As indicated above, each scan of the zone of measurement 410 will produce a count of clock pulses within the gap and a count of clock pulses representing the diameter of the portion of the bottle 102 within the scanning plane 350. The upper part of the table of FIG. 6 illustrates the gap dimensions (in centimeters) and the lower part the diameter dimensions (in centimeters). For example, the second column referred to by reference character C indicates the various gap and diameter sizes as the bottle is rotated to a vertical position which corresponds to 100 control pulses applied to vertical stepping motor driver 328 from the start position. By way of further example, the second gap row referred to by reference character GR, and the second diameter now referred to by reference character DR, indicate the various gap and diameter dimensions, respectively, along the bottle height as the bottle is viewed from a rotational angle which corresponds to two control pulses applied to rotational stepping motor driver 331 from the start position.

The first column represents the dimensions which would result from the initial execution of the rotational loop including steps 505, 506, 507 and 508. A first control pulse would be provided to rotational stepping motor driver 331 and the scan would be initiated to provide a clock pulse count indicating that the gap distance for the portion being scanned equals 1.1374 cm and a clock pulse count indicating that the diameter of the portion of the bottle being scanned equals 3.5162 cm. Rotational stepping motor driver 331 would then be incremented by one control pulse resulting in the dimensions of row 2 (referred to by GR and DR) showing that the gap size equals 1.1391 and the diameter size equals 3.5167. Looking down the first column corresponding to a vertical count of zero, the dimensions from rotational count 1 to rotational count 4 for the gap are increasing indicating that the bottle is positioned off-center and, as it is rotated, the gap is widening. The second column C corresponds to the next series of scans after a first complete rotation of platform 316.

Looking down the first column for the diameter dimensions, it can be seen that the heel diameter of the bottle varies from a minimum of 3.5161 cm to a maximum of 3.5169 cm. Considering the body diameter (dimension) B as indicated by the vertical columns 0, 100, and 6,000, the diameter varies from a minimum of 3.5149 to a maximum of 3.5169. CPU 301 compares these maximums and minimums to preset tolerances to determine whether or not the body diameter is within desired limits. Dimension B can also be determined by averaging all of the dimensions of the diameter within columns 0, 100 and 6,000 and rows 1–400 and this average can be compared to a desired average by comparator 375.

Columns 12,400 and 12,500 and rows 1–400 of the diameter dimensions indicate that the maximum E dimension is 1.1499 and the minimum E dimension of lower finish 207 is 1.1479. Referring to rows 1–400 of the gap dimension, it can be noted that the gap dimension transitions from approximately 1.138 to approximately 2.316 indicating that the gap adjacent to dimension D is less than the gap adjacent to dimension E. This indication provides the necessary information to permit the reconstruction of the profile of the bottle from the dimensions in the table.

Column 16,900 shows in rows 1–400 corresponding to diameter that dimension A has a minimum of 1.2031 and a maximum of 1.2037. Similarly, column 17,000, rows 1–400 of diameter dimensions provide dimensions for dimension E between dimension A and dimension T of middle finish 204. Column 17,200 corresponds to dimension T/2+E/2. Column 17,400 corresponds to dimension E/2+T/2. Dimension T can be calculated in one of several ways. For example, the columns can be added together and column 17,000, representing dimension E at middle finish 204, can be subtracted from the total. Alternatively, the column representing dimension E at upper finish 210 (e.g., column 17,600, not shown) could be subtracted from the total. Alternatively, half of column 17,000, representing dimension E/2, could be subtracted from column 17,200 to obtain T/2. Half of column 17,600, representing dimension E/2, could also be subtracted from column 17,400 to obtain T/2. Alternatively, part of or one or more columns of E dimensions (e.g., columns 12,400, 12,500, 17,000) could be averaged to provide an E dimension or an E/2 dimension. Also, the difference between the gap dimensions of column 17,200 and column 17,400 (i.e., approximately 0.1 cm) defines height h of the thread. Column 19,300 corresponds to dimension F.

From the table of FIG. 6, dimensions D and H can be determined in the following manner. From row 1 of the gap dimensions, it is noted that the gap dimensions significantly increase at 12,400 indicating a transition to finish 207 and providing dimension E. At 16,900, the gap dimension decreases to 2.3005 indicating a transition to locking ring 205. At column 17,000, the gap dimension increases to 2.3164 indicating a transition from locking ring 205 to middle finish portion 204. The height from the perspective of rotational position 1 equals $19,300 \times 0.05''/100 = 9.65''$. Alternatively, if the height of the end of rod 326 is known, say 9.75'', the height can be determined by reference thereto as noted by reference character H', i.e., $9.75'' - (19,600 - 19,300) \times 0.05''/100 = 9.60''$. The tilt from the perspective of rotational positions 1 and 4 equals the difference in the height at these two positions. In the illustrated table, no tilt was assumed.

At column 19,300, the gap dimension for row 1 transitions from 2.4158 to 5.5071 indicating the top 201 of the bottle. Accordingly, dimension D equals 19,300 control pulses minus 16,900 control pulses or 2,400 control pulses which corresponds to 1.2000 cm. Dimension D equals 19,300 control pulses minus zero pulses which corresponds to 9.6500 cm.

At column 19,600, the gap dimensions transition again from 5.5070 to 2.5130 indicating that rod 326 has now crossed the scanning plane and is within the zone of measurement. The corresponding diameter dimensions show that the rod has a diameter of approximately 0.500 cm. This measured dimension can be compared to the reference diameter for the rod which is stored in memory 360 to verify the calibration and accuracy of the optical micrometer 300.

The lean of the bottle can also be determined. In general, the lean equals the difference between the distance of the axial center point from a vertical reference of two different horizontal scanned portions of the bottle. For example, the center point of the horizontal scan at vertical count 100 from a perspective of rotational count 3 is $1.1396 cm + (\frac{1}{2})(3.5151 cm) = 2.8971 cm$ from the vertical reference (i.e., photodetector 309). The center point of the horizontal scan at vertical count 17,000 from a perspective of rotational count 3 is $2.3169 cm + (\frac{1}{2})(1.1485 cm) = 2.8911 cm$ from the vertical reference. Therefore, the lean between the horizontal scans at vertical counts 100 and 17,000 from a perspective of rotational count 3 is $2.8971 cm - 2.8911 cm = 0.0060 cm$. The lean between the horizontal scans at vertical counts 6,000 and 19,300 from a perspective of rotational count 4 is $1.1398 cm + (\frac{1}{2})(3.5155 cm) - (2.4166 cm + (\frac{1}{2})(0.9490 cm)) = 0.0064 cm$. Alternatively, the lean can be calculated as noted above with regard to FIG. 2A.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for measuring a profile of portions of an article by determining the spatial relationship between portions, said apparatus comprising:
   means for aligning the portions of the article article to be profiled with a predefined plane; and
   means for measuring the width of each portion of the article aligned with the predefined plane and for measuring the distance of each portion of the article from a first reference.

2. The apparatus of claim 1 wherein said means for measuring includes means for scanning each portion of the article located within the predefined plane with a beam of radiant energy and for scanning the distance of a gap between each portion and the first reference.

3. The apparatus of claim 2 wherein said means for aligning comprises means for rotating the article about an axis intersecting the plane within the scan of the beam and means for axially moving the article along an axis parallel to the intersecting axis within the scan of the beam.

4. The apparatus of claim 3 wherein said means for scanning comprises an optical micrometer including a light source providing collimated light as a scanning beam of radiant energy.

5. The apparatus of claim 3 wherein said means for rotating comprises a base positioned substantially perpendicular to the intersecting axis and adapted to support the article, and a first servo system adapted to axially rotate the base about an axis parallel to the intersecting axis; and wherein said means for axially moving comprises a second servo system adapted to move the base along an axis parallel to the intersecting axis.

6. The apparatus of claim 3 wherein said means for rotating comprises a base positioned substantially perpendicular to the intersecting axis and adapted to support the article, and a first stepping motor adapted to axially rotate the base about an axis parallel to the intersecting axis; and wherein said means for axially moving comprises a second stepping motor adapted to move the base along an axis parallel to the intersecting axis.

7. The apparatus of claim 6 further including a shaft adapted to support the base and engage the first stepping motor for axial rotation thereby, a traveling nut supporting the first stepping motor and a threaded shaft engaging the traveling nut and having a longitudinal axis parallel to the intersecting axis, the second stepping motor adapted to engage the threaded shaft and rotate it about its longitudinal axis and wherein said base comprises a platform having an upper surface adapted to support the article and having a lower surface connected to said shaft whereby the traveling nut, the first stepping motor and the platform move along the intersecting axis when the second stepping motor rotates the threaded shaft.

8. The apparatus of claim 7 further comprising reference means for providing a reference spaced a known distance from the predefined plane.

9. The apparatus of claim 8 further comprising a rod supported by the traveling nut as the reference, said rod positioned substantially parallel to the intersecting axis.

10. The apparatus of claim 9 wherein said rod is U-shaped having one leg supported by the traveling nut and having a second leg located over the platform coaxial with the intersecting axis such that the article is located between the second leg and the platform.

11. The apparatus of claim 6 further comprising:
   means for controlling said means for moving and said means for measuring such that the first and second stepping motors and the means for measuring synchronously operate to scan a plurality of portions and gap distances of the article;
   means for determining the profile of the article from the scanned portions and the scanned gap distances; and
   means for comparing the determined profile to a desired profile.

12. The apparatus of claim 11 wherein said means for controlling comprises a central processing unit (CPU) and further comprising a first stepping motor driver adapted to receive pulses from the CPU and operate the first stepping motor in response thereto and a second stepping motor driver adapted to receive pulses from the CPU and operate the second stepping motor in response thereto.

13. The apparatus of claim 12 further comprising a first counter for counting the pulses provided by the CPU to the first stepping motor and a second counter for counting the pulses provided by the CPU to the second stepping motor.

14. The apparatus of claim 13, said CPU includes a random access memory associated with the CPU adapted to store dimensions and further including a read only memory associated with the CPU adapted to instruct the CPU to sequentially operate the first and second stepping motors and to monitor operation of the means for measuring.

15. The apparatus of claim 1 further comprising reference means for providing a second reference spaced a known distance from the predefined plane.

16. The apparatus of claim 1 wherein said means for aligning comprises means for moving the article through a predefined plane so that the portions of the article to be profiled pass through the predefined plane.

17. The apparatus of claim 1 wherein said means for aligning comprises means for moving the predefined plane with respect to the portions of the article to be profiled.

18. The apparatus of claim 1 wherein said means for aligning comprises means for moving the predefined plane across the portions of the article to be profiled so that the predefined plane moves over the portions of the article to be profiled.

19. A method for measuring the profile of portions of an article by determining the spatial relationship between portions, said method comprising the steps of:
   aligning the portions of the article to be profiled with a predefined plane;
   measuring the width of each portion of the article aligned with the predefined plane; and
   measuring the distance of the portion of the article from a first reference.

20. The method of claim 19 wherein said step of measuring the width includes scanning the portion of the article located within the predefined plane with a beam of radiant energy and said step of measuring the distance includes scanning the distance between the portion and the first reference with the beam of radiant energy.

21. The method of claim 20 wherein said step of aligning comprises the steps of rotating the article about an axis intersecting the plane within the scan of the beam and axially moving the article along an axis parallel to the intersecting axis within the scan of the beam.

22. The method of claim 21 wherein said step of scanning comprises scanning a beam of radiant energy provided by an optical micrometer including a light source providing collimated light as the beam of radiant energy.

23. The method of claim 21 wherein said step of moving comprises rotating the article about an axis intersecting the plane and axially moving the article along an axis parallel to the intersecting axis.

24. The method of claim 23 wherein the step of axially moving comprises moving a base, positioned substantially perpendicular to the intersecting axis and adapted to support the article, along an axis parallel to the intersecting axis by a second servo system; and wherein said step of rotating comprises axially rotating the base by a first servo system.

25. The method of claim 23 wherein the step of axially moving comprises moving a base, positioned substantially perpendicular to the intersecting axis and adapted to support the article, along an axis parallel to the intersecting axis by a second stepping motor; and wherein said step of rotating comprises axially rotating the base by a first stepping motor.

26. The method of claim 25 wherein the steps of measuring the width and measuring the distance include scanning a plurality of portions and gap distances of the article with a laser micrometer and further comprising the steps of synchronously operating the first and second stepping motors and the laser micrometer to scan the plurality of portions and gap distances of the article; determining the profile of the article from the scanned portions and the scanned gap distances; and comparing the determined profile to a desired profile.

27. The method of claim 26 further comprising the steps of counting pulses provided by a CPU to the first stepping motor and counting pulses provided by the CPU to the second stepping motor.

28. The method of claim 27 further comprising storing dimensions determined by the step of measuring in a random access memory associated with the CPU and sequentially operating the laser micrometer and the first and second stepping motors.

29. The method of claim 19 wherein said aligning step comprises moving the article through a predefined plane so that the portions of the article to be profiled pass through the predefined plane.

30. The method of claim 19 wherein said aligning step comprises moving the predefined plane with respect to the portions of the article to be profiled.

31. The method of claim 19 wherein said aligning step comprises moving the predefined plane across the portions of the article to be profiled so that the predefined plane moves over the portions of the article to be profiled.

32. The method of claim 19 further comprising the step of searching of a minimum or maximum dimension of the article.

33. Apparatus for inspecting an article manufactured by multiple molds comprising:
   means for identifying the cavity from which the article was molded;
   means for aligning portions of the identified article with a predefined plane;
   means for measuring the width of each portion of the article aligned with the predefined plane and for measuring the distance of each portion of the article from a first reference thereby to form a measured profile; and means for comparing the measured profile to a reference profile.

34. The apparatus of claim 33 further including means, responsive to the means for identifying, for selecting articles to be inspected.

35. The apparatus of claim 34 wherein said means for selecting is responsive to the means for comparing.

36. The apparatus of claim 35 further including means, responsive to the means for comparing, for selecting articles having profiles which are not within preset limits of the reference profile.

37. The apparatus of claim 33 wherein said means for measuring includes means for scanning the portion of the article located within the predefined plane with a beam of radiant energy and for scanning the distance between the portion and the first reference.

38. The apparatus of claim 37 wherein said means for aligning comprises means for rotating the article about an axis intersecting the plane within the scan of the beam and means for axially moving the article along an axis parallel to the intersecting axis within the scan of the beam.

39. The apparatus of claim 38 wherein said means for scanning comprises an optical micrometer including a light source providing collimated light as a beam of radiant energy.

40. The apparatus of claim 37 wherein said means for scanning comprises an optical micrometer and further comprising:
a first stepping motor adapted to rotate the article along an axis intersecting the predefined plane;
a second stepping motor adapted to move the article along the intersecting axis;
means for controlling said means for aligning and said means for measuring such that the first and second stepping motors and the optical micrometer synchronously operate to scan a plurality of portions and gap distances between the first reference and the portions of the article;
means for determining the measured profile of the article from the scanned portions and the scanned gap distances; and
means for comparing the determined profile to a desired profile.

41. The apparatus of claim 33 wherein the article is a bottle and said means for measuring includes means for scanning the bottle adapted to determine its body diameter and its height.

42. The apparatus of claim 33 wherein the article is a bottle and said means for measuring includes means for scanning the bottle adapted to determine the outside diameter at the top of the sealing surface at the mouth of the bottle.

43. The apparatus of claim 33 wherein the article is a bottle and said means for measuring includes means for scanning the bottle adapted to determine the outside diameter of the thread around the finish of the bottle.

44. The apparatus of claim 33 wherein the article is a bottle and said means for measuring includes means for scanning the bottle adapted to determine the diameter across the thread root which forms the transition between the thread and the finish of the bottle.

45. The apparatus of claim 33 wherein the article is a bottle and said means for measuring includes means for scanning the bottle adapted to determine the outside diameter of the locking ring on the finish of the bottle.

46. The apparatus of claim 33 wherein the article is a bottle and said means for measuring includes means for scanning the bottle adapted to determine the height of the finish of the bottle.

47. The apparatus of claim 33 wherein the article is a bottle and said means for measuring includes means for scanning the bottle adapted to determine the lead of the bottle.

48. The apparatus of claim 33 wherein the article is a bottle and said means for measuring includes means for scanning the bottle adapted to determine the tilt of the top of the bottle.

49. The apparatus of claim 33 wherein said means for aligning comprises means for moving the article through a predefined plane so that the portions of the article to be profiled pass through the predefined plane.

50. The apparatus of claim 33 wherein said means for aligning comprises means for moving the predefined plane with respect to the portions of the article to be profiled.

51. The apparatus of claim 33 wherein said means for aligning comprises means for moving the predefined plane across the portions of the article to be profiled so that the predefined plane moves over the portions of the article to be profiled.

* * * * *